(12) United States Patent
Glaubitt et al.

(10) Patent No.: US 7,241,505 B2
(45) Date of Patent: Jul. 10, 2007

(54) HYBRID SOL FOR THE PRODUCTION OF ABRASION-RESISTANT SIO₂ ANTIREFLECTION COATINGS

(75) Inventors: Walther Glaubitt, Margetshöchheim (DE); Monika Kursawe, Seeheim-Jugenheim (DE); Andreas Gombert, Freiburg (DE); Thomas Hofmann, Fürth (DE)

(73) Assignee: Merck Patent, GmbH, Darmstadt (DE)

( * ) Notice: Subject to any disclaimer, the term of this patent is extended or adjusted under 35 U.S.C. 154(b) by 124 days.

(21) Appl. No.: 10/490,310

(22) PCT Filed: Sep. 19, 2002

(86) PCT No.: PCT/EP02/10492

§ 371 (c)(1),
(2), (4) Date: Mar. 19, 2004

(87) PCT Pub. No.: WO03/027015

PCT Pub. Date: Apr. 3, 2003

(65) Prior Publication Data

US 2004/0248995 A1    Dec. 9, 2004

(30) Foreign Application Priority Data

Sep. 21, 2001    (DE)    ................. 101 46 676

(51) Int. Cl.
*B32B 17/06* (2006.01)
(52) U.S. Cl. .................... 428/429; 528/39; 528/12

(58) Field of Classification Search ................ 428/429; 528/39, 12
See application file for complete search history.

(56) References Cited

U.S. PATENT DOCUMENTS 5,394,269 A * 2/1995 Takamatsu et al. ......... 359/580
6,921,578 B2 * 7/2005 Tsujino et al. .............. 428/428

FOREIGN PATENT DOCUMENTS

| DE | 100 51 724 | 5/2002 |
|----|------------|--------|
| EP | 0 597 490 | 5/1994 |
| EP | 0 974 560 | 1/2000 |
| EP | 1 167 313 | 1/2002 |
| JP | 08 122501 | 5/1996 |
| WO | 98 45113 | 10/1998 |
| WO | 00 10934 | 3/2000 |

* cited by examiner

*Primary Examiner*—Kuo-Liang Peng
(74) *Attorney, Agent, or Firm*—Millen, White, Zelano & Branigan, P.C.

(57) ABSTRACT

Hybrid sol comprising $[SiO_x(OH)_y]_n$ particles, where $0<y<4$ and $0<x<2$, which consist of a mixture of a first fraction of particles having a particle size of 4–15 nm and a second fraction of particles having a mean particle size of 15–60 nm, water and a solvent; obtainable by hydrolytic polycondensation of tetraalkoxysilanes in an aqueous, solvent-containing medium with addition of a monodisperse silicon oxide hydroxide sol having a mean particle size of 15–60 nm and a maximum standard deviation of 20%, and the preparation and use thereof.

22 Claims, No Drawings

HYBRID SOL FOR THE PRODUCTION OF ABRASION-RESISTANT SiO₂ ANTIREFLECTION COATINGS

The invention relates to a stable sol comprising [SiO$_x$(OH)$_y$]$_{-n}$ particles for the production of an abrasion-resistant, porous SiO$_2$ antireflection layer on substrates, preferably glass, and to a process for the preparation of this solution. The porous SiO$_2$ antireflection layer increases the transmission of light over the entire solar spectrum. Glass which has been provided with a porous SiO$_2$ antireflection layer of this type is therefore particularly suitable for covers of solar collectors and photovoltaic cells.

In the case of perpendicular incidence of light, reflection losses of about 4% arise at air/glass interfaces. The losses in the case of glasses used for covering solar systems, such as, for example, photovoltaic cells or solar collectors, reduce the efficiency of the systems.

A number of processes exist for the coating of glasses with the aim of increasing the transmission of light. The application of multiple interference layers is usual. Here, two or more layers of high- and low-refractive-index materials are applied alternately one on top of the other. The reflected waves are then extinguished in a certain wavelength range. Examples thereof are antireflection layers on architectural glass from Schott Glaswerke, which are produced by a sol-gel process and are applied via dip coatings. However, the frequency band width of these antireflection coatings is limited physically to one octave and is only suitable for antireflection coatings in the visible region, but not for antireflection coatings in the broad-band solar spectrum.

Besides the conventional multiple coatings, it is also possible to generate an antireflection action by means of a single coating. In this case, glass is coated with a so-called $\lambda/4$ layer, i.e. a layer having the optical thickness $\lambda/4$ ($\lambda$=wavelength of the desired reflection minimum), where the refractive index of the layer should ideally have the value $\sqrt{n_D^{(glass)} \cdot n_D^{(air)}}$. In this case, the amplitudes of the reflected waves at $\lambda$ are extinguished. With a conventional refractive index of low-iron glass of $n_D=1.5$, an optimum refractive index of the antireflection layer of 1.22 arises. In this case, the reflection of electromagnetic radiation having the wavelength $\lambda$ is zero.

The most-used antireflection monolayer of this type is a $\lambda/4$ layer of MgF$_2$ having a refractive index of 1.38 applied by vapour deposition. The residual reflection in this case is 1.2% at the reflection minimum. A lower refractive index cannot be achieved by means of stable, dense layers.

Porous coatings offer the possibility of further reducing the refractive index of a monolayer. Three methods are described for this purpose: etching of glass, application of a porous layer, and a combination of a porous layer and an etching process.

Glasses which are suitable for etching are soda-lime glasses (U.S. Pat. No. 2,490,662) and those which have a phase separation in the matrix, enabling a soluble phase to be dissolved out with the etchant. U.S. Pat. No. 4,019,884 describes a process for the production of an antireflection layer on borosilicate glass having a reflection of less than 2% in the wavelength range 0.4–2.0 mm by heating the borosilicate glass to a temperature of 630–660° C. for 1–10 hours in order to generate a stable surface by phase separation, followed by treatment with hydrofluoric acid for 1–4 hours at 630–660° C. This process has the disadvantage of the use of hydrofluoric acid and poor homogeneity of the etched layer.

U.S. Pat. No. 4,535,026 also discloses the subsequent etching of glasses which have previously been provided with a porous SiO$_2$ layer. The coating solution used for this purpose is obtained by reaction of silicon alkoxide with water and a catalyst in alcohol. The dried gel layer is heated in order to remove organic constituents and to generate an adequate abrasion stability of the layer. A porous SiO$_2$ layer is obtained, but a subsequent etching step is necessary in order to enlarge the pores. Ultimately, this process enables an antireflection layer having 0.1% residual reflection to be obtained.

The preparation of a coating solution which enables the production of an abrasion-stable, porous SiO$_2$ antireflection layer which does not have to be subsequently etched has not been described hitherto. On the contrary, it is a generally accepted procedure in the production of porous antireflection layers to expose the SiO$_2$ gel layers merely to temperatures of up to 500° C. in order to obtain the porosity of the layer and to prevent the layer sintering together, accompanied by a reduction in the pore volume. The refractive index of the layer would thus increase and the effect of the antireflection layer would be impaired (Sol Gel Science, C. J. Brinker, G. W. Scherer, Academic Press 1990, pp. 583, 631; Sol-Gel Technology for Thin Films, Noyes Publications, 1988, ed. Lisa. C. Klein, p. 70). However, heating of the gel layer at the highest possible temperatures is necessary in order to achieve good abrasion resistance of the layer through crosslinking of the orthosilicic acid network in the layer. Cathro et al. in Solar Energy 32, 1984, p. 573, describe that sufficiently wipe-resistant SiO$_2$ antireflection layers on glass would only be obtainable by heating to at least 500° C. Moulton et al. in U.S. Pat. No. 2,601,123 even indicate that the temperature during heat treatment of the gel layer should be in the softening range of the glass. Even higher temperatures are necessary for the production of safety glass. Here, the glass must be softened at a temperature of at least 600° C., generally even 700° C., before it is toughened by a quenching process.

Inadequate abrasion resistance is exhibited by antireflection layers applied to glass surfaces by the process described in DE 196 42 419. In a DIN EN 1096-2 abrasion test, the layer is removed completely after 100 strokes. The layer exhibits damage after only 10 strokes.

DE 198 28 231 describes a process for the deposition of porous optical layers of metal oxides on glasses, ceramics or metals by applying an aqueous sol or sol mixture to which a surfactant has been added to the substrate to be coated and heat-treating the latter at temperatures of from 100 to 550° C. The layers obtained have better abrasion resistance than the layers described in DE 196 42 419. In a DIN EN 1096-2 abrasion test, however, they exhibit damage after 100 strokes.

DE 100 51 725, which was not published before the priority date of the present application, describes an aqueous coating solution comprising SiO$_2$ particles for the deposition of a porous antireflection layer on glass, which is heat-treated in a roll furnace at temperatures of up to 700° C. The optically transparent layer has high abrasion resistance. In a DIN EN 1096-2 abrasion test, the layer has no scratches even after 100 strokes.

However, it is disadvantageous that the silicon dioxide layer has, as a system property, a striped structure which adversely affects the aesthetic appearance, although the variations in reflection capacity within the layer are not measurable.

A further disadvantage is the poor coatability of structured glass, which results in low solar transmission for coated structured glasses.

In addition, hardening in a roll furnace naturally also causes layer-thickness in homogeneities.

The object of the invention is to provide a coating solution for the production of an antireflection layer having a refractive index which is close to the optimum refractive index of 1.22 and which has high abrasion resistance and a homogeneous appearance and is also suitable for coating structured glass. A further object of the invention is to avoid layer inhomogeneities caused by roll furnaces.

This object is achieved in accordance with the invention by a hybrid sol comprising $[SiO_x(OH)_y]_n$ particles, where $0<y<4$ and $0<x<2$, which consist of a mixture of a first fraction of particles having a particle size of 4–15 nm and a second fraction of particles having a mean particle size of 20–60 nm, water and a solvent; obtainable by hydrolytic polycondensation of tetraalkoxysilanes in an aqueous, solvent-containing medium, giving silicon oxide hydroxide particles having a particle size essentially in the range 4–15 nm, with addition of a monodisperse silicon oxide hydroxide sol having a mean particle size, based on the number of particles, of 20–60 nm and a maximum standard deviation of 20%.

Particular embodiments are shown in the sub-claims.

This object is furthermore achieved by a process for the preparation of a hybrid sol by hydrolytic polycondensation of a tetraalkoxysilane in an aqueous, solvent-containing medium, giving a hydrolysis mixture comprising silicon oxide hydroxide particles having a particle size of 4–15 nm, and addition of a monodisperse silicon oxide hydroxide sol having a mean particle size of 20–60 nm and a maximum standard deviation of 20%, at a time at least 5 minutes after addition of the tetraalkoxysilane to the aqueous, solvent-containing medium.

The invention furthermore relates to an abrasion-resistant, optically transparent, silicon dioxide layer on glasses having a refractive index which is between 1.20 and 1.40 and is thus close to the optimum refractive index of 1.22. Silicon dioxide layers of this type on glasses can have reflection-reducing properties.

The hybrid sol according to the invention comprises a mixture of large and small silicon oxide hydroxide particles. The small fraction consists of particles having a particle size essentially in the range 4–15 nm, and the large fraction consists of monodisperse spherical particles having a mean particle size of 20–60 nm and a maximum standard deviation of 20%.

The weight ratio between the small particle fraction and the large particle fraction in the hybrid sol is from 25:1 to 1:5, preferably from 10:1 to 2:1 and particularly preferably from 3:1 to 2:1.

The total concentration of the silicon oxide hydroxide particles in the hybrid sol is between 0.3 and 4% by weight. It is preferably set to 1.0–2.0% by weight.

The hybrid sol according to the invention is prepared with addition of solvents. Use is made of lower aliphatic alcohols, for example ethanol or i-propanol, but also ketones, preferably lower dialkyl ketones, such as acetone or methyl isobutyl ketone, ethers, preferably lower dialkyl ethers, such as diethyl ether or dibutyl ether, tetrahydrofuran, amides, esters, in particular ethyl acetate, dimethylformamide, amines, in particular triethylamine, and mixtures thereof.

Preference is given to alcohols as solvent, in particular ethanol, methanol, i-propanol, n-propanol and very particularly preferably ethanol.

The amount of solvent employed depends on the amount of silicon compounds employed as starting material. The concentration of the solvent in the hybrid sol is between 2 and 97% by weight, preferably 15–30%.

The hybrid sol can be prepared with addition of a basic catalyst. The addition of catalysts of this type increases the pH in the hydrolysis mixture to a value of $\geq 7$. The basic catalyst accelerates the hydrolytic condensation and promotes particle growth. Use is made, for example, of ammonia or basic polymers, such as polyethyleneimines, as catalysts. Preference is given to the use of ammonia.

In addition, a stabiliser can subsequently also be added to the hybrid sol according to the invention. Stabilisers which can be employed are, for example, glycol ethers or ethers of other alcohols. They may be present in the hybrid sol in a concentration of up to 95% by weight, preferably from 10 to 80% by weight and particularly preferably from 40 to 70% by weight. A particularly suitable stabiliser has proven to be 1,2-propylene glycol monomethyl ether.

In addition to hydrolysed (partially) condensed silicon compounds, the hybrid sol according to the invention may comprise one or more organic polymers dissolved in colloidally disperse form. These polymers contain OH and/or NH groups, and the mean molecular weights are between 200 and 10,000, with the molar ratio of polymer to tetraalkoxysilane being from 0.001 mol/mol of silane to 0.5 mol/mol of silane. These polymers can be removed by increasing the temperature after application of the hybrid sol to substrates to be coated therewith and drying of the layer, thus further increasing the pore volume of the coating.

In addition, the hybrid sol also comprises water in an amount of 2–80% by weight, preferably 2–50% by weight and particularly preferably 10–35% by weight.

In a preferred embodiment, the hybrid sol comprises

1–2% by weight of $[SiO_x(OH)_y]_n$ particles, where $0<y<4$ and $0<x<2$,

40–70% by weight of stabiliser,

15–30% by weight of solvent and

10–35% by weight of water, where the weight ratio between the small particle fraction and the large particle fraction is from 10:1 to 2:1.

The hybrid sol according to the invention is prepared as follows:

Firstly, a tetraalkoxysilane is added to an aqueous, solvent-containing medium, during which the hydrolytic polycondensation commences. The process is carried out essentially in accordance with DE 196 42 419 and with mixing. It is also possible, if desired, to add a basic catalyst for hydrolytic polycondensation to this mixture, which shortens the reaction times. Preference is given to the use of ammonia.

The solvent present in the hydrolysis mixture can be selected from the solvents already mentioned above. Preference is given to the use of ethanol, methanol, i-propanol, n-propanol and very particularly preferably ethanol.

The hydrolysis is carried out at temperatures of from 5 to 90° C., preferably from 10 to 30° C.

During this, the small silicon oxide hydroxide particles having a particle size of 4–15 nm form from the tetraalkoxysilane employed.

The hydrolysis mixture is mixed vigorously, for example by stirring, for a period of at least 5 minutes after addition of the tetraalkoxysilane.

A sol comprising monodisperse silicon oxide hydroxide particles having a mean particle size of from 20 to 60 nm and a maximum standard deviation of 20% is then added to the hydrolysis mixture described above.

The time before addition of the silicon oxide hydroxide sol comprising monodisperse particles to the hydrolysis mixture is dependent on the use of condensation catalysts for the hydrolytic condensation of the silicon compounds.

At the earliest 5 minutes after addition of the tetraalkoxysilane to the aqueous, solvent-containing hydrolysis mixture, the monodisperse silicon oxide hydroxide sol is added to this mixture. The time of this addition can be delayed to up to 48 hours after addition of the tetraalkoxysilane to the hydrolysis mixture. This time is preferably from 5 minutes to 24 hours after commencement of the formation of silicon oxide hydroxide particles having a particle size of 4–15 nm. A period of from 20 to 180 minutes after commencement of the reaction is particularly preferred.

If the time of addition is extended to more than 48 hours after commencement of the reaction, no further differences in the properties of the hybrid sol are observed compared with addition within 48 hours.

The time of addition of the silicon oxide hydroxide sol comprising monodisperse particles to the hydrolysis mixture crucially determines the properties of the hybrid sol according to the invention. In this way, a random distribution of the monodisperse particles in the small silicon oxide hydroxide particles is achieved and accumulation of the monodisperse particles in the sense of "island formation" is avoided, which would result in poor abrasion stability.

The monodisperse silicon oxide hydroxide sol is preferably added to the hydrolysis mixture in one portion.

In a particular embodiment, the silicon oxide hydroxide sol comprising monodisperse particles is prepared by the process described in U.S. Pat. No. 4,775,520. To this end, the tetraalkoxysilane is introduced into an aqueous-alcoholic-ammoniacal hydrolysis mixture and mixed vigorously, producing primary silicon oxide hydroxide particles. Suitable tetraalkoxysilanes are all orthosilicates of aliphatic alcohols that can be hydrolysed without problems. Primarily suitable here are the esters of aliphatic alcohols having 1–5 carbon atoms, such as, for example, of methanol, ethanol, n- or i-propanol and the isomeric butanols and pentanols. These can be employed individually, but also in the form of a mixture. Preference is given to the orthosilicates of $C_1$–$C_3$-alcohols, in particular tetraethoxysilane. Suitable as the alcohol component are aliphatic $C_1$–$C_5$-alcohols, preferably $C_1$–$C_3$-alcohols, such as methanol, ethanol and n- or i-propanol. These can be in individual form, but also in the form of a mixture with one another. The tetraalkoxysilane is preferably added to the mixture in one portion, where the reactant can be in pure form or alternatively in a solution in one of the alcohols mentioned. For producing the primary silicon oxide hydroxide particles, a concentration of tetraalkoxysilane in the reaction mixture of between about 0.01 and about 1 mol/l can be selected. After the reactants have been combined, the reaction commences immediately or after a few minutes, which is evident from immediate opalescence of the reaction mixture due to the particles formed. Further tetraalkoxysilane is subsequently added continuously to the hydrolysis mixture comprising primary silicon oxide hydroxide particles in such a way that essentially no new silicon oxide hydroxide particles are formed. Instead, the primary silicon oxide hydroxide particles already present grow to form larger, monodisperse particles.

Depending on the choice of reactants and their concentration in the reaction mixture, particles having a mean particle size of between 20 nm and 60 nm and having a maximum standard deviation of 20% can be obtained.

It has proven advantageous to carry out the reaction for the production of these particles at elevated temperature. Favourable temperatures here are between 35° C. and 80° C., preferably between 40° C. and 70° C. It has been found that the particle size scattering decreases at elevated temperature, but so does the mean particle size. At lower temperatures, i.e. around room temperature, larger particles with greater size scattering are obtained under otherwise identical conditions.

In order to increase the stability of the monodisperse silicon oxide hydroxide sol, it may be necessary to remove alcohol and/or ammonia from the sol. This is carried out by the known methods of the prior art, for example by increasing the temperature in order to remove the volatile ammonia.

The term "monodisperse" here refers to particles which have a maximum standard deviation of 20%, in particular 15% and particularly preferably 12% and which are essentially in the form of discrete particles.

The silicon oxide hydroxide sol comprising monodisperse particles is added to the hydrolysis mixture with vigorous mixing, preferably by stirring. At temperatures of from 10 to 40° C., this mixing is continued for a period of from 1 minute to 48 hours, preferably from 10 minutes to 5 hours.

In the subsequent step of the process for the preparation of the hybrid sol, a stabiliser can be added to the hybrid sol. The stabilisers employed are, for example, glycol ethers or ethers of other alcohols. Preference is given to the use of 1,2-propylene glycol 1-monomethyl ether. The stabilised sol mixture is subsequently mixed vigorously for a period of from 1 minute to 24 hours, preferably from 5 minutes to 1 hour.

If necessary, the hybrid sol formed can subsequently be filtered. In this case, filtration through a conventional filter, preferably having a pore width of 1–5 μm, gives the desired sol, which can be sent to further use.

The hybrid sol according to the invention is applied to the surfaces whose reflections are to be reduced and dried by conventional methods. It goes without saying that, depending on the desired layer thickness, the viscosity of the coating solution according to the invention and the parameters of the coating process, for example the rate of immersion and removal of the substrate to be coated into or from the coating solution, must be matched to one another.

It likewise goes without saying that the substrate to be coated is subjected to conventional cleaning and/or surface pre-treatment methods which are generally used in coating technology before the coating. The type of pre-treatment here can have a very positive effect on the coating result. However, the totality of measures necessary for this purpose are adequately known to the person skilled in the art.

Suitable processes for application of the hybrid sol to the surfaces whose reflections are to be reduced are, for example, dipping processes, spray processes or rotational-coating processes. The usual drawing speeds in dipping processes are between 0.5 and 70 cm/min.

The glass sheets coated with the hybrid sol according to the invention can be subjected to temperatures above 700° C. without the applied layer sintering in the process and a significant loss of porosity and, associated therewith, a loss in transmission being observed. The hardening process is carried out in a manner corresponding to the production of safety glass. This means that the coated glass is heated to the softening point and then quenched. Layers of known sol-gel systems sinter from a temperature of about 550° C. (Sol Gel Science, C. F. Brinker, G. W. Scherer, Academic Press 1990, pp. 583, 631; Sol-Gel Technology for Thin Films, Noyes Publications, 1988, ed. Lisa C. Klein, p. 70).

Surprisingly, it has been found that hardening of the layer which corresponds in abrasion stability to the layer hardened at 700° C. can be achieved even by drying at room temperature over a period of a few hours. An effect of this type has not been described hitherto. It is contrary to the conventional school of thought that temperature treatment is necessary for the hardening of sol-gel-derived $SiO_2$ layers. Thus, Cathro et al. point out in Solar Energie 32 (1984), p. 573, that $SiO_2$ antireflection layers with adequate wiping resistance can only be obtained by hardening at least 500° C. Moulton et al. in U.S. Pat. No. 2,601,123 even indicate that the temperature during heat treatment of the gel layer should be in the softening range of the glass. This opens up the possibility of obtaining abrasion-resistant antireflection layers on safety glass by firstly hardening the uncoated glass in a roll furnace and then carrying out the coating. This enables layer inhomogeneities caused by the furnace process to be avoided.

This process naturally does not exclude the possibility of the abrasion resistance of the reflection-reducing layers obtained being further improved by additional mechanical post-treatment (smoothing, polishing etc.).

The antireflection layers obtained using the hybrid sol are distinguished by high abrasion stability. The abrasion resistance has been tested in accordance with DIN EN 1096-2. In this test, a felt loaded with a weight is rubbed to and fro on the layer. With a test weight of 400 g, no damage to the layer was observed after 100 strokes. Even on use of a test weight of 1000 g, the layer remained unscratched.

The layer obtained using the hybrid sol according to the invention thus has considerably better abrasion resistance than an antireflection layer obtained using the sol described in DE 196 42 419, as this layer exhibits considerable damage after only 10 strokes.

Compared with the sol described in DE 100 51 725, the layer obtained by means of the hybrid sol according to the invention exhibits a more homogeneous appearance with the same abrasion resistance. The layer does not have a striped structure. The positive properties of the two sols known from the prior art are thus combined.

A further advantage of the hybrid sol according to the invention is the good coatability of structured glass. A structured glass sheet which has a prism structure on one side and is slightly roughened on the other side has 94.6% solar transmission (AM 1.5) when coated with the hybrid sol according to the invention, compared with only 93.1% solar transmission (AM 1.5) when coated with the aqueous sol in accordance with DE 100 51 725. The term AM 1.5 here refers to a standardised calculation of the solar transmission, where the measured transmission value is multiplied by the weighting factor AM. The term AM here stands for the air mass index, while the 1.5 relates to the light conditions in central Europe.

With the aid of SEM photomicrographs, it has been found that the antireflection layer obtained using the hybrid sol according to the invention has the following structure:

Spherical $SiO_2$ particles having a mean particle size of 20–60 nm and a maximum standard deviation of 20% are homogeneously embedded in a network of small $SiO_2$ particles having a particle size of 4–15 nm. This results in high abrasion resistance at the same time as an excellent aesthetic appearance of the layer.

A structure of this type is not obtained if a sol in accordance with DE 196 42 419 and the spherical $SiO_2$ particles prepared as described in U.S. Pat. No. 4,775,520 are simply mixed with one another. A mixture of this type does not produce layers which have a homogeneous structure. The abrasion resistance of a layer produced with a mixture of this type and the aesthetics as well as the coatability of structured glass are deficient.

The invention is explained in greater detail with reference to working examples.

EXAMPLE 1

29.4 g of an aqueous, 0.08 N ammonium hydroxide solution are mixed completely with 380 g of ethanol, and 50.7 g of tetramethoxysilane are added thereto with further stirring. After a stirring time of 150 minutes, 400 g of 5% monodisperse silicon oxide hydroxide sol comprising silicon oxide hydroxide particles having a mean particle size of 25 nm are added, and the mixture is stirred for a further 60 minutes, when 970 g of 1,2-propylene glycol monomethyl ether are added to the batch. The hybrid sol prepared in this way is subsequently filtered through a glass-fibre prefilter.

EXAMPLE 2

25.4 g of polyethylene glycol having a mean molecular weight of 200 g/mol are dissolved in a mixture of 29.4 g of 0.08 N aqueous ammonium hydroxide and 357 g of ethanol. 50.8 g of tetramethoxysilane are added to this solution with stirring. After a stirring time of 125 minutes, 400 g of 5% monodisperse silicon oxide hydroxide sol comprising silicon oxide hydroxide particles having a mean particle size of 25 nm are added, and the mixture is stirred for a further 30 minutes, when 1300 g of 1,2-propylene glycol monomethyl ether are added to the batch. The hybrid sol prepared in this way is subsequently filtered through a glass-fibre prefilter.

The invention claimed is:

1. Hybrid sol comprising:
   $[SiO_x(OH)_y]_n$ particles, where $0<y<4$ and $0<x<2$, which consist of a mixture of a first fraction of particles having a particle size of 4–15 nm and a second fraction of particles having a mean particle size of 20–60 nm where the weight ratio between the first fraction and the second fraction is from 10:1 to 2:1,
   water and
   a solvent,
   wherein the sol is obtained by a process comprising:
   hydrolytic polycondensation of tetraalkoxysilanes in an aqueous, solvent-containing medium by addition of the tetraalkoxysilanes to the aqueous, solvent-containing medium, resulting in a hydrolysis mixture comprising silicon oxide hydroxide particles having a particle size of 4–15 nm,
   followed by addition to the hydrolysis mixture of a monodisperse silicon oxide hydroxide sol essentially in the form of discrete particles having a mean particle size of 20–60 nm and a maximum standard deviation of 20%, said addition being at least 5 minutes after addition of the tetraalkoxysilanes to the aqueous, solvent-containing medium.

2. Hybrid sol according to claim 1, where the hydrolytic polycondensation is carried out in the presence of a basic catalyst.

3. Hybrid sol according to claim 1, further comprising a stabiliser which is added subsequent to the addition of the monodisperse silicon hydroxide sol.

4. Hybrid sol according to claim 3, where the stabiliser is a glycol ether or an ether of another alcohol or a mixture of these ethers.

5. Hybrid sol according to claim 1, where the monodisperse silicon oxide hydroxide sol is obtained by a process comprising: addition of a tetraalkoxysilane to an aqueous-alcoholic ammoniacal hydrolysis mixture, with formation of primary silicon oxide hydroxide particles, and continuous addition of further tetraalkoxysilane to this mixture in such a way that essentially no further particles are formed.

6. Hybrid sol according to claim 5, where the process for obtaining the monodisperse silicon oxide hydroxide sol is conducted at a temperature of 35–80° C.

7. Hybrid sol according to claim 5, where alcohol and ammonia are removed from the monodisperse silicon oxide hydroxide sol before it is added to the hydrolysis mixture to form the hybrid sol.

8. Hybrid sol according to claim 1, where the concentration of the total amount of $[SiO_x(OH)_y]_n$ particles in the hybrid sol is 0.3–4% by weight.

9. Hybrid sol according to claim 1, where the solvent is methanol, ethanol, i-propanol or n-propanol.

10. Hybrid sol according to claim 1, comprising 0.3–4% by weight of $[SiO_x(OH)_y]_n$ particles, 2–80% by weight of water and 2–97% by weight of solvent.

11. Hybrid sol according to claim 3, comprising 1–2% by weight of $[SiO_x(OH)_y]_n$ particles, 10–35% by weight of water, 15–30% by weight of solvent and 40–70% by weight of stabiliser.

12. Glass having a porous antireflection layer of silicon dioxide having a refractive index of from 1.20 to 1.40, deposited from a hybrid sol according to claim 1.

13. Hybrid sol according to claim 1, wherein the sol has a random distribution of the second fraction of particles in the first fraction of particles.

14. Hybrid sol according to claim 1, wherein the solvent is acetone, methyl isobutyl ketone, diethyl ether, dibutyl ether, tetrahydrofuran, ethyl acetate, dimethylformamide, triethylamine, ethanol, methanol, i-propanol, n-propanol or mixtures thereof.

15. Process for the preparation of a hybrid sol comprising: $[SiO_x(OH)_y]_n$ particles, where $0<y<4$ and $0<x<2$, which consist of a mixture of a first fraction of particles having a particle size of 4–15 nm and a second fraction of particles having a mean particle size of 20–60 nm, water and a solvent, which process comprises: hydrolytic polycondensation of a tetraalkoxysilane in an aqueous, solvent-containing medium by addition of the tetraalkoxysilanes to the aqueous, solvent-containing medium, resulting in a hydrolysis mixture comprising silicon oxide hydroxide particles having a particle size of 4–15 nm, followed by addition of a monodisperse silicon oxide hydroxide sol having a mean particle size of 20–60 nm and a maximum standard deviation of 20% to the hydrolysis mixture at a time at least 5 minutes after addition of the tetraalkoxysilane to the aqueous, solvent-containing medium.

16. Process according to claim 15, where the hydrolytic polycondensation is carried out at a temperature of from 5 to 90° C.

17. Process according to claim 15, where the hybrid sol is mixed vigorously for a period of from 1 minute to 48 hours at temperatures of from 10 to 40° C. after addition of the monodisperse silicon oxide hydroxide sol.

18. Process according to claim 15, where the hydrolysis mixture comprising silicon oxide hydroxide particles having a particle size of 4–15 nm is prepared with addition of a basic catalyst and has a pH of $\geq 7$.

19. Process according to claim 15, where a stabiliser is added to the hybrid sol subsequent to the addition of the monodisperse silicon hydroxide sol.

20. Process according to claim 19, where the stabiliser is a glycol ether or an ether of another alcohol or a mixture of these ethers.

21. Process according to claim 15, where the addition of the monodisperse silicon oxide hydroxide sol to the hydrolysis mixture is carried out at a time from at least 5 minutes to at most 48 hours after addition of the tetraalkoxysilane to the aqueous, solvent-containing medium.

22. Process according to claim 21, where the addition is carried out after from 20 to 180 minutes.

* * * * *